(12) United States Patent
Büttner et al.

(10) Patent No.: US 12,255,496 B2
(45) Date of Patent: Mar. 18, 2025

(54) JOINING A LAMINATED CORE TO A SHAFT

(71) Applicant: Innomotics GmbH, Nuremberg (DE)

(72) Inventors: Klaus Büttner, Hollstadt (DE); Klaus Kirchner, Ostheim (DE); Matthias Warmuth, Windshausen (DE)

(73) Assignee: Siemens Aktiengesellschaft, Munich (DE)

( * ) Notice: Subject to any disclaimer, the term of this patent is extended or adjusted under 35 U.S.C. 154(b) by 491 days.

(21) Appl. No.: 17/421,635

(22) PCT Filed: Dec. 16, 2019

(86) PCT No.: PCT/EP2019/085320
§ 371 (c)(1),
(2) Date: Jul. 8, 2021

(87) PCT Pub. No.: WO2020/148048
PCT Pub. Date: Jul. 23, 2020

(65) Prior Publication Data
US 2022/0077737 A1    Mar. 10, 2022

(30) Foreign Application Priority Data

Jan. 18, 2019 (EP) .................................... 19152433

(51) Int. Cl.
*H02K 1/28* (2006.01)
*H02K 7/00* (2006.01)
*H02K 15/02* (2006.01)
*H02K 15/028* (2025.01)

(52) U.S. Cl.
CPC ............... *H02K 1/28* (2013.01); *H02K 7/003* (2013.01); *H02K 15/028* (2013.01)

(58) Field of Classification Search
CPC ......... H02K 7/003; H02K 1/28; H02K 15/028
USPC ................................................... 310/216.121
See application file for complete search history.

(56) References Cited

U.S. PATENT DOCUMENTS

| 5,170,086 A | 12/1992 | Wrobel et al. |
| 5,907,208 A | 5/1999 | Kristen et al. |
| 5,986,366 A * | 11/1999 | Bailey ..................... H02K 9/00 |
| | | 417/353 |

(Continued)

FOREIGN PATENT DOCUMENTS

| CN | 1189712 A | 8/1998 |
| CN | 101827521 A | 1/2010 |

(Continued)

OTHER PUBLICATIONS

Machine translation of foreign document DE 102016215701 (Year: 2018).*

(Continued)

*Primary Examiner* — Alex W Mok
(74) *Attorney, Agent, or Firm* — Henry M. Felereisen LLC

(57) ABSTRACT

A lamination of a rotor of a rotary dynamo-electric machine includes a shaft bore with a radius, at least two pull-through grooves, and two intermediate space recesses. Each of the pull-through grooves has a lamination tongue facing radially inwards towards an axis such that the lamination tongue ends facing radially inwards lie on a radius which is smaller than the radius defined by the shaft bore.

17 Claims, 8 Drawing Sheets

(56) References Cited

U.S. PATENT DOCUMENTS

| | | | |
|---|---|---|---|
| 6,265,802 B1 | 7/2001 | Getschmann | |
| 7,309,940 B2* | 12/2007 | Nommensen | H02K 1/28 310/216.044 |
| 7,948,133 B2* | 5/2011 | Fu | H02K 1/28 310/156.09 |
| 8,896,176 B2* | 11/2014 | Ryu | H02K 1/276 310/156.09 |
| 9,225,211 B2* | 12/2015 | Naito | H02K 1/28 |
| 9,793,768 B2* | 10/2017 | Tanaka | H02K 1/278 |
| 10,211,689 B2* | 2/2019 | Liang | H02K 1/2766 |
| 10,491,062 B2* | 11/2019 | Groschup | H02K 7/003 |
| 2005/0275305 A1* | 12/2005 | Nommensen | H02K 1/185 310/216.044 |
| 2006/0103256 A1* | 5/2006 | Welke | H02K 1/20 310/91 |
| 2010/0013350 A1* | 1/2010 | Fu | H02K 1/28 310/216.001 |
| 2010/0187944 A1 | 7/2010 | Ossenkopp et al. | |
| 2013/0020898 A1 | 1/2013 | Kim et al. | |
| 2013/0043761 A1* | 2/2013 | Kaimori | H02K 1/28 310/216.123 |
| 2013/0293057 A1* | 11/2013 | Naito | H02K 1/28 310/216.123 |
| 2014/0041207 A1* | 2/2014 | Matsushita | H02K 15/02 29/598 |
| 2014/0062243 A1* | 3/2014 | Falk | H02K 1/28 310/156.08 |
| 2017/0117766 A1 | 4/2017 | Paul et al. | |
| 2017/0264153 A1 | 9/2017 | Groschup et al. | |
| 2019/0252936 A1 | 8/2019 | Okamoto et al. | |

FOREIGN PATENT DOCUMENTS

| | | | | |
|---|---|---|---|---|
| CN | 203774910 U | 8/2014 | | |
| CN | 106464045 A | 2/2017 | | |
| DE | 3435508 A1 | 4/1986 | | |
| DE | 102011121531 A1 | 6/2013 | | |
| DE | 102014216905 A1 | 3/2016 | | |
| DE | 102016215701 A1 * | 2/2018 | | F16C 33/586 |
| JP | 2005024020 A * | 1/2005 | | F16C 33/586 |
| JP | 2005295744 A | 10/2005 | | |
| JP | 2006 217770 A | 8/2006 | | |
| WO | WO-2009077224 A1 * | 6/2009 | | H02K 1/28 |
| WO | WO 2018-051631 A1 | 3/2018 | | |
| WO | WO 2018-224261 A1 | 12/2018 | | |

OTHER PUBLICATIONS

Machine translation of foreign document WO 2009077224 (Year: 2009).*

Translation of foreign document JP 2005024020 A (Year: 2005).*

PCT International Search Report and Written Opinion of International Searching Authority mailed Oct. 2, 2020 corresponding to PCT International Application No. PCT/EP2019/085320 filed Dec. 16, 2019.

* cited by examiner

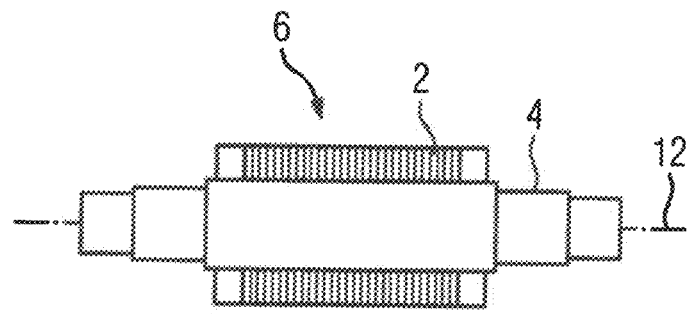
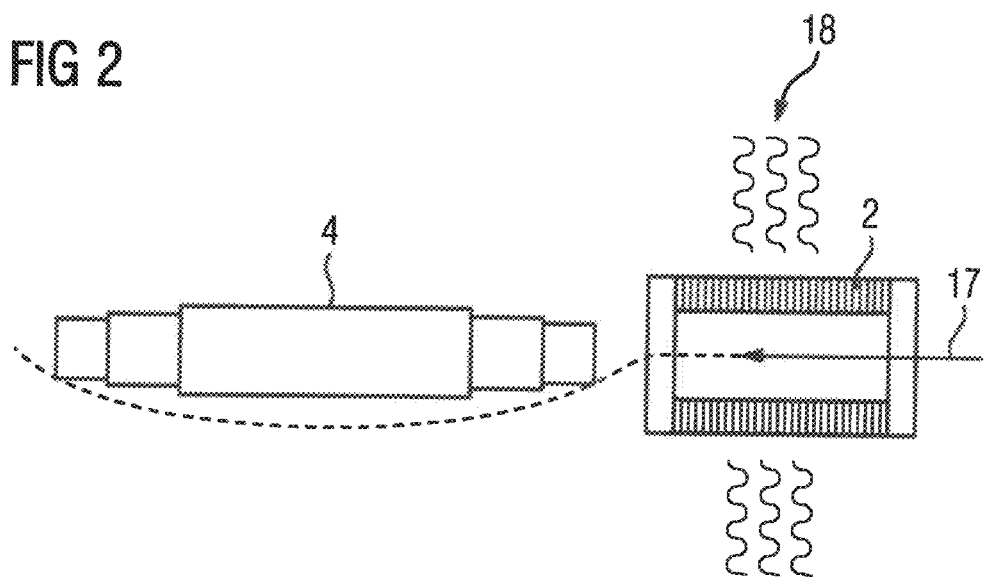

JOINING A LAMINATED CORE TO A SHAFT

CROSS-REFERENCES TO RELATED APPLICATIONS

This application is the U.S. National Stage of International Application No. PCT/EP2019/085320, filed Dec. 16, 2019, which designated the United States and has been published as International Publication No. WO 2020/148048 A1 and which claims the priority of European Patent Application, Ser. No. 19/152,433.9, filed Jan. 18, 2019, pursuant to 35 U.S.C. 119 (a)-(d).

BACKGROUND OF THE INVENTION

The invention relates to a lamination of a rotor of a rotary dynamo-electric machine, a laminated core of a rotor of a rotary dynamo-electric machine, a dynamo-electric machine with a rotor designed in such a way and a method for manufacturing a rotor.

Dynamo-electric machines are used as generators or motors. With a motor, the torque generated thereby is transferred from the rotor or rotor laminated core to the shaft. This ensures a stability of the laminated core on the shaft. This applies above all with vertically constructed motors. The press fit required for this therefore has a comparatively high oversize of the shaft in relation to the package bore or shaft bore of the laminated core.

When the laminated core is pressed upon, the shaft is ideally braced against the shaft end face in order to obtain as large a surface as possible as support. In order to restrict an axial pressing force or joining force when the laminated core is slid onto the shaft, the laminated core of the rotor is heated with approximately 250° C. to 300° C. As a result, thermal expansion of the shaft bore and thus a reduction in the required axial joining force are achieved. It is therefore possible to remain below the permissible compressive strength of the contact surface of the shaft during the joining process. With shafts with an unfavorable length and diameter ratio, there is, however, the risk of a shaft buckling. The following disadvantages result herefrom:

The laminated cores of the rotor must be heated when joined, in order to reduce the joining force, this requires a handling of hot components, which is to be avoided from an occupational safety viewpoint.

Furthermore, downstream manufacturing processes, such as the overrevving or balancing of the rotor, cannot take place directly immediately thereafter. The rotor must firstly be cooled down again to room temperature. An integration of this manufacturing step into a chained, automated manufacture of a rotor or an electric machine is significantly hampered as a result. In particular, with a high variance of the rotors, i.e. different shaft diameter, rotor diameter and with different axial lengths of the laminated cores, different heating and cooling times are to be taken into consideration.

A further possibility of transferring the torque consists in joining the laminated cores of the rotor with a fitted key safety device to the shaft. With chamfered rotors, these must however be cleared.

A curing time is also to be taken into account with glued connections, furthermore, glues under heat fluctuations, such as occur during operation of the dynamo-electric machines, are restricted with respect their durability.

On this basis the object underlying the invention is to produce a connection between a laminated core of a rotor and a shaft, which is also suited to an automated manufacture without however having the afore-cited disadvantages.

SUMMARY OF THE INVENTION

The solution to the set object is achieved by a lamination of a rotor of a rotary dynamo-electric machine with a shaft bore with a radius R1, with at least two pull-through grooves and two intermediate space recesses, wherein each of the pull-through grooves has at least one lamination tongue facing radially inwards towards an axis so that the lamination tongue ends facing radially inwards lie on a radius R2, wherein R2 is smaller than R1.

The solution to the set object is likewise achieved by a laminated core of a rotor of a rotary dynamo-electric machine with inventive laminations, wherein, in the axially layered sequence, the laminations of the rotor are layered as follows at least in sections in the axial direction, the laminations with lamination tongues are arranged between laminations which have. Intermediate space recesses in this region.

The set object is likewise achieved by an electric machine having a rotor, which has an inventive laminated core.

The object is likewise achieved by using an inventive dynamo-electric rotary machine in compressors, pumps, and machine tools.

The solution to the set object is likewise achieved by a method for joining an inventive laminated core to a shaft by means of the following steps
providing a laminated core as claimed in claim 6,
providing a shaft in a device,
axially pressing the laminated core with the shaft bore onto the shaft up to a predetermined axial position.

In accordance with the invention, it is now achieved that the laminated core of the rotor can be joined cold and nevertheless the required torque strength and axial stability of the laminated core on the shaft is provided. The axial joining forces are reduced, so that during manufacture the compressive strength of the support surface of the shaft and a danger of the shaft buckling no longer result.

This is achieved in particular in that the press fit is only designed with a comparatively small oversize, wherein the required axial joining force is therefore reduced by approx. 50%. On account of the reduced oversize alone, with the "cold" method, a reduced torque strength would now result. In order to achieve at least the previous torque strength, the previous torque strength is achieved on account of additional small form fits of the individual laminations with the shaft.

This is achieved in accordance with the invention by lamination tongues on pull-through grooves, which are arranged on the inner diameter of the laminations and project into the shaft bore. These. Ideally project approx. 0.2 to 0.3 mm. Into the shaft bore. Depending on the axial height of the dynamo-electric machine, these values can also be exceeded or not met.

These lamination tongues in the pull-through grooves are already produced when the individual laminations are stamped, so that no additional manufacturing outlay is required.

Similarly, intermediate space recesses are provided on the inner diameter and can already be produced when the individual laminations are stamped.

In one embodiment, the pull-through grooves and thus the lamination tongues and the intermediate space recess of a lamination are now positioned offset by 180° on the inner diameter of the laminations by means of a stamping process. When the laminations are strung together with a predeterminable angle of twist of 90° between the pull-through grooves and intermediate space recess, which allows a lamination tongue to project into a clearance in an intermediate space recess, a laminated core provides the respective one axial clearance of a lamination strength upstream and downstream of each lamination tongue. This establishes the possibility of a slightly resilient axial deformation of the lamination tongue. When the lamination core with the inventive laminations is joined to a shaft, the lamination tongue or lamination tongues of a lamination evade here axially into this. Intermediate space recess of the adjacent lamination.

In the direction of rotation, this lamination tongue nevertheless has a higher rigidity. The shafts are typically processed with a roughness of RZ25. When the laminated core of the rotor is joined axially, these lamination tongues rub along the shaft over the processed surface and smooth the tips of the processing notches on the shaft. As a result, a minimal form-fit is already embodied in the width of the lamination tongues during the joining process. The axial joining force portion of the lamination tongues is comparably small in relation to the mainly cylindrical version, since these can easily bend. The sum of the form fits however produces a comparatively high level of anti-rotation protection of the entire laminated core on the shaft.

On account of this cold joining, the compressive strength of the shaft end face, i.e. the risk of the shaft buckling during the manufacturing process, is now avoided. Maintenance times are therefore also no longer to be provided in the manufacturing flow since no thermal processes accompany this joining process.

The shaft-hub connection is therefore also reliably embodied during the entire service life.

Particularly advantageously, with an automated manufacturing process, an automation is also conceivable with a high variance of the rotor since no cooling is required with different required times. The resilience achieved by means of the lamination tongues reliably equates to expansions of the shaft bore as a result of heating during operation or centrifugal force loads, without compromising the positioning, in particular the anti-rotation protection.

An axial catching of the lamination tongues therefore also offers axial protection against slippage of the laminated core on the shaft. The manufacturing joining method can also be applied to typically chamfered laminated cores of the rotor without additional processing.

BRIEF DESCRIPTION OF THE DRAWING

The invention and advantageous embodiments of the invention are explained in more detail on the basis of examples shown in principle; It is shown in:

FIG. 1 a rotor with a laminated core embodied as a squirrel cage rotor on a shaft, FIG. 2 shows a basic joining process according to the prior art.

DETAILED DESCRIPTION OF PREFERRED EMBODIMENTS

Figure 3:
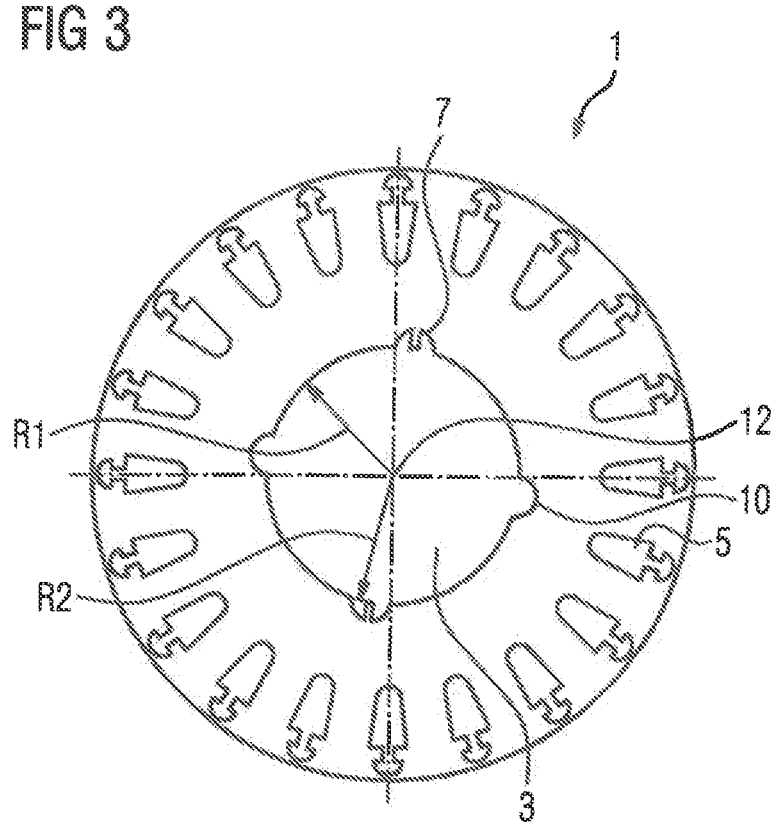
FIG. 3 shows an inventive lamination.

FIG. 1 shows in principle a longitudinal section of a shaft 4, on which a laminated core 2 of a rotor 6 is positioned. This represents the end state between the laminated core 2 and shaft 4, which is aspired to by electromechanical engineers in order to transfer a torque from a dynamo-electric machine 24 via the rotor 6 to the shaft 4, or with a generator vice versa to direct the torque into the machine.

FIG. 2 shows in principle a manufacturing method according to the prior art, in which the laminated core 2 is pressed axially onto a shaft 4 by means of an axial joining force 17 when the laminated core 2 is additionally heated 18. Here there is always the risk of the shaft 4 buckling (indicated with dashes) with excessively high axial joining forces 17. In this regard the joining force 17 nevertheless finally determines the anti-rotation protection of the laminated core 2 and shaft 4 and thus the transmission behavior of the torque.

FIG. 3 now shows an inventive lamination 1, wherein pull-through grooves 7 are provided in the region of the shaft bore 3. The pull-through grooves 7 have lamination tongues 8 projecting in the direction of an axis 12. The shaft bore 3 has a radius R1, the lamination tongues 8 are arranged on a radius R2. Here the radius R2 is smaller than the radius R1, namely by approx. 0.2 to 0.3 mm.

In this case the pull-through grooves 7 are arranged 180° relative to one another. Intermediate space recesses 10 are arranged offset by 90° with respect to a pull-through groove 7. With an axially stacked laminated core 2, each second lamination 1 is arranged about 90° with respect to the preceding lamination 1, so that a lamination tongue 8 can evade into the intermediate space recess 10 arranged offset by 90° and thus has an axial space for evasion during the joining process and then in the end position on the shaft 4.

Only one pull-through groove 7 and only one intermediate space recess 10 are possible per lamination 1. A number of pull-through grooves 7 and intermediate space recesses 10 per lamination 1 are likewise also possible. Care should however be taken when packaging the laminated cores 2 to ensure that when the laminated cores 2 are joined to the shaft 4, the lamination tongues 8 of the pull-through grooves 7, in particular their ends 9 can evade. Into the intermediate space recesses 10 of the adjacent laminations 1.

This is achieved by the accordingly angular distribution of the pull-through grooves 7 and intermediate space recesses 10 on the shaft bore 3 during the stamping process of the laminations 1 and subsequently aligned packaging of the laminated core 2. Therefore, with four pull-through grooves 7 per lamination 1, intermediate space recesses 10 are accordingly also to be carried out on this lamination 1. The pull-through grooves 7 are then arranged offset by in each case 90° like the intermediate space recesses 10 of this lamination 1 viewed in the circumferential direction. With this lamination 1 there is 45° between the pull-through groove 7 and the intermediate space recess 10.

With the packaging of the laminated core 2, the subsequent lamination 1 must then be rotated in each case about 45°, in order to ensure that a lamination tongue 8 can evade into the intermediate space recess 10 arranged offset by 45° and thus has an axial space for evasion during the joining process and then in the end position on the shaft 4.

Figure 4:
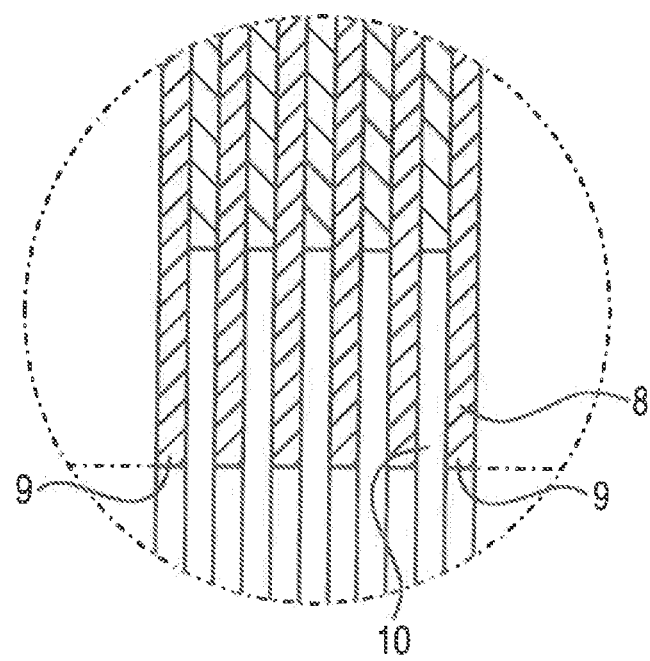
FIG. 4 shows a detailed representation of an. Inventive laminated core.
Figure 9:
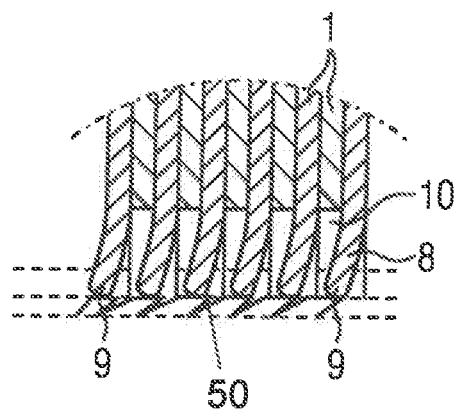
FIG. 9 shows a detailed representation of a laminated core on a shaft.

FIG. 4 shows a corresponding axial arrangement of this lamination 1, with an intermediate space 10, into which the lamination tongues 8 can evade axially, as shown in principle in FIG. 9.

As ultimately the rotor 6 itself is embodied as a squirrel cage rotor or permanently excited rotor 6 or provided with a separate winding system which is powered by way of slip rings, it finally plays less of a roll in the axial layering of the laminated core 2 on the shaft 4.

In the axial course of the grooves 5 of the laminated core 2 of the rotor 6, it should be noted that these are essentially arranged axially flush. It should therefore be noted that both the grooves 5 and also the pull-through grooves 7 are axially flush with intermediate space recesses 10 in the predetermined axial sequence.

Grooves 5 of a squirrel cage rotor are shown by way of example in FIG. 3, which should however finally not constrict the inventive concept.

Figure 5:
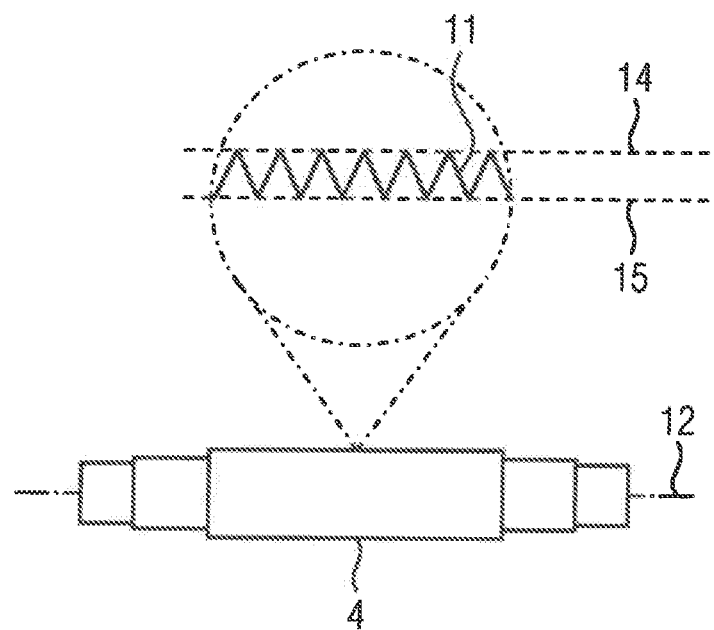
FIG. 5 shows a detailed representation of the roughness of a shaft.
Figure 6:
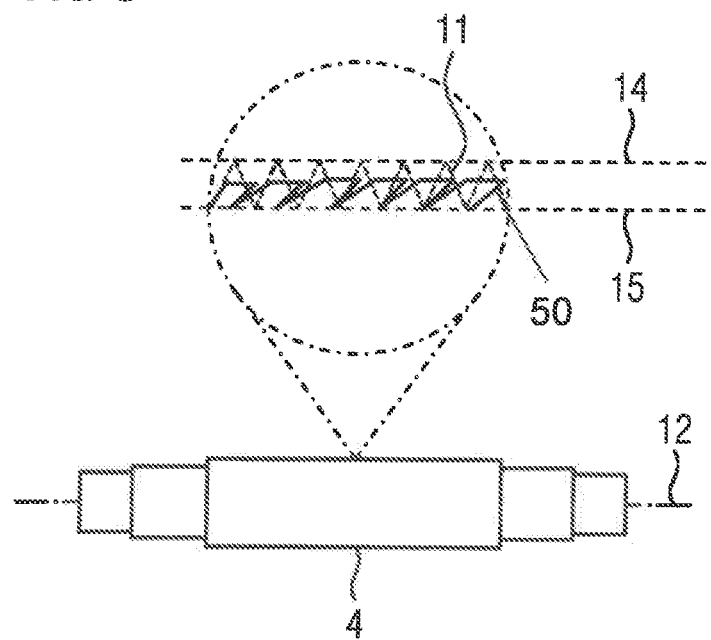
FIG. 6 shows a detailed representation of the roughness of a shaft after the joining process.

FIG. 5 shows a shaft 4 after the processing and before the joining process, wherein a roughness 11 is present, which extends between a base profile 15 and a reference profile 14. After the joining process, the roughness 11 is now reduced in the region of the lamination tongues 8, in particular by means of the axial joining, wherein the lamination tongues 8 on the reference profile 14 reduce the roughness 11, as shown in principle in FIG. 6. The locally reduced roughness is detected as form-fit score marks 50 in the axial direction of the shaft.

Figure 7:
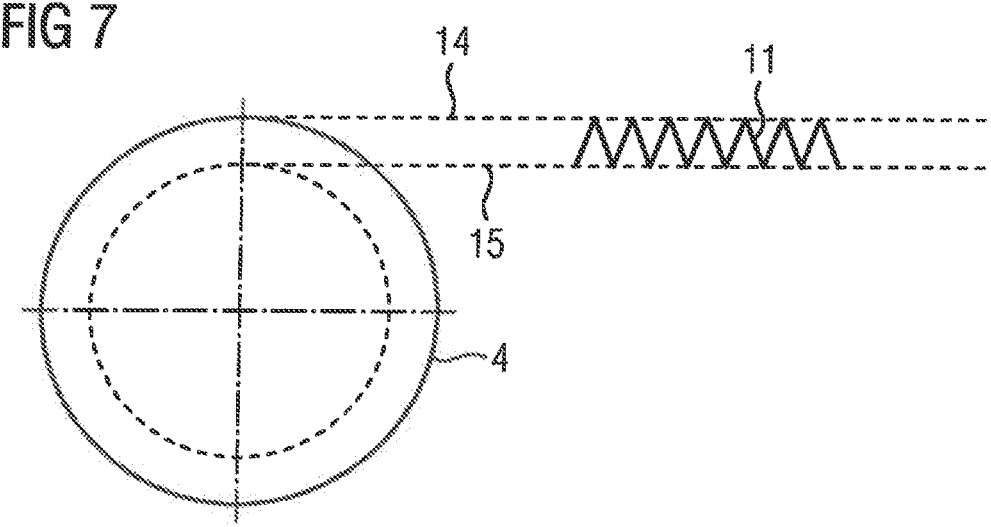
FIG. 7 shows a shaft before the joining process.

FIG. 7 also shows this in the cross-section of the shaft 4, wherein both in the axial direction and also in the circumferential direction a roughness 11 is present on the surface of the shaft 4 in each case.

Figure 8:
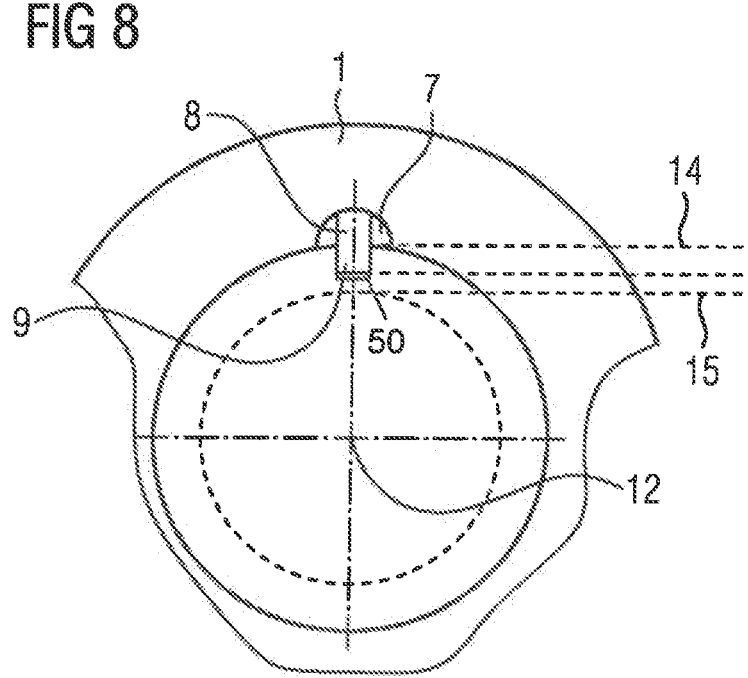
FIG. 8 shows a shaft after the joining process.

FIG. 8 shows a detailed view of a lamination 1, which is positioned on the shaft 4, and in which a lamination tongue 8 of the pull-through groove 7 engages into the shaft 4, and thus in the region of the axial joining of the lamination tongues 8 to the shaft 4 contributes to reducing the roughness 11 and thus forms form-fit score marks 50 under the lamination tongue 8 in that region.

In a further detailed representation in a partial longitudinal section according to FIG. 9, the axial sequence of the lamination 1 on the shaft 4 is now shown. The lamination tongues 8 are folded here at their end 9 and have therefore contributed to reducing the roughness 11 by forming form-fit score marks 50 under the lamination tongue 8. The lamination tongues 8 of the pull-through grooves 7, viewed axially, evade into the intermediate space 10 of the adjacent lamination 1.

After the joining process of the laminated core 2 with the inventive laminations 1 to the shaft 4, form-fit score marks 50 are now detected on the outer diameter of the shaft.

Figure 10:
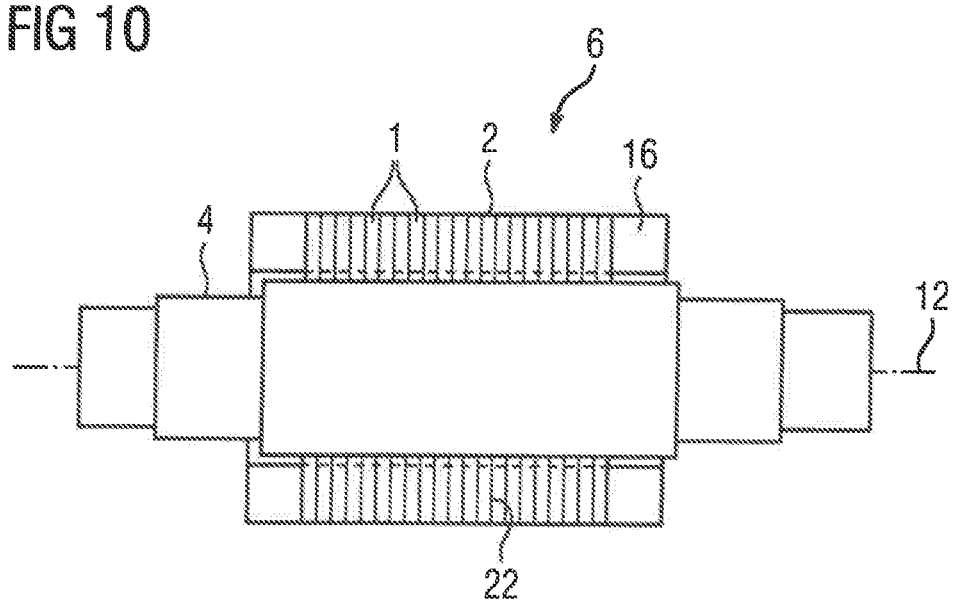
FIG. 10 shows a laminated core joined to a shaft.

FIG. 10 shows the laminated core 2 during the axial joining process to the shaft 4.

Figure 11:
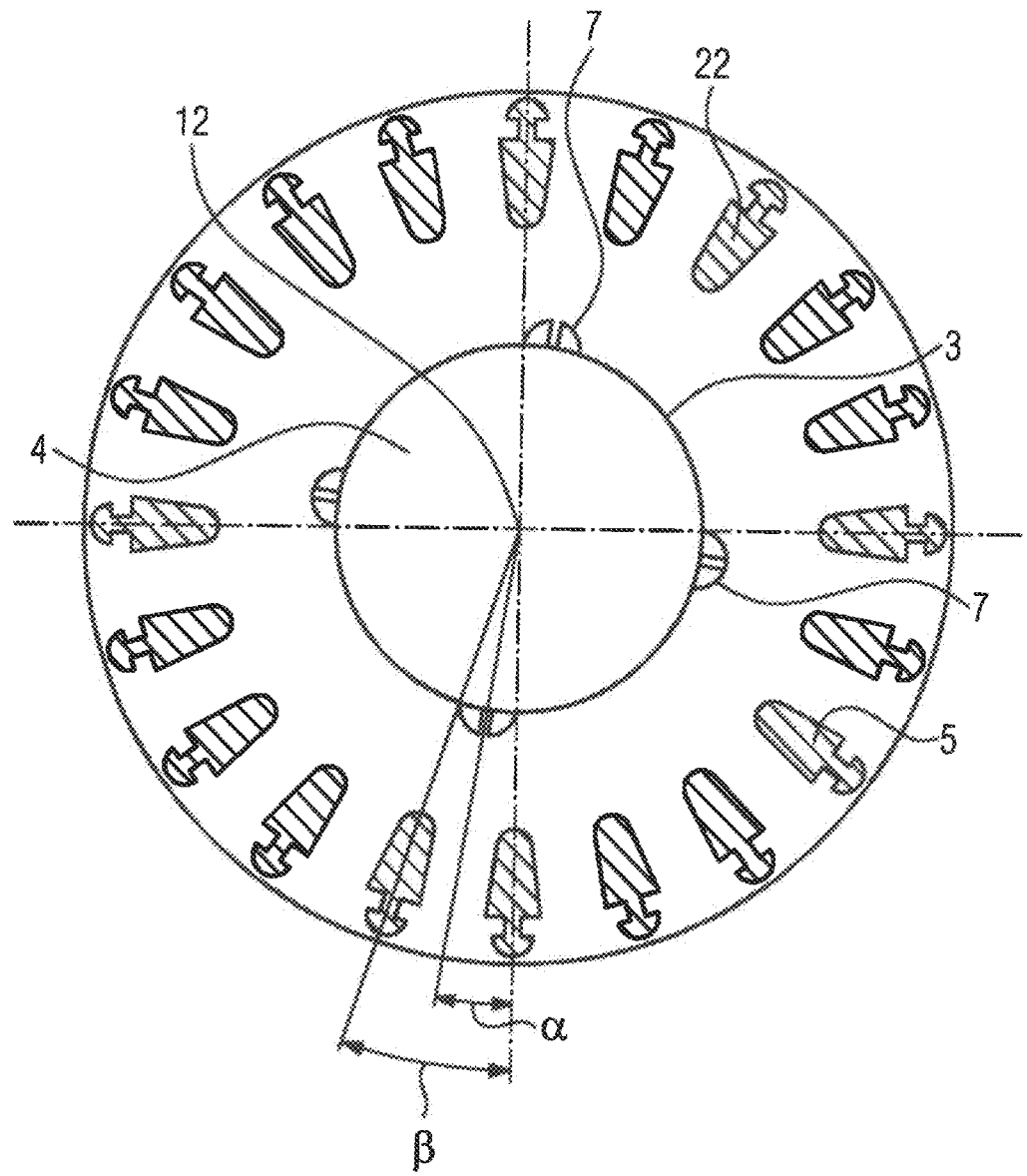
FIG. 11 shows a cross-section of a rotor.

According to FIG. 11, the following view. Is now apparent with a laminated core 2 of the rotor 6 on a shaft 4. In this embodiment, an angle is α, which designates the offset of the pull-through groove 7 in relation to a groove 5. In this embodiment the pull-through groove 7 is arranged between two grooves 5. α therefore corresponds to half the groove pitch β of the rotor 6.

The grooves 5 of the rotor 6 are occupied by electrical conductors 22, which can be inserted axially as rods or have been formed by means of a pressure casting method. The short-circuit rings 16 not shown in this representation are soldered or electrically contacted with the conductors 22 by means of a cold spray method. Similarly, it is above all possible with the pressure casting method for the short-circuit rings 16 to be cast with the conductors 22 in a casting process.

In another embodiment, a and 1 can also be identical.

Figure 12:
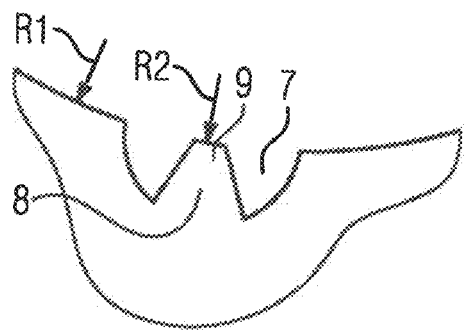
FIG. 12 shows a pull-through groove with a trapezoid lamination tongue.
Figure 13:
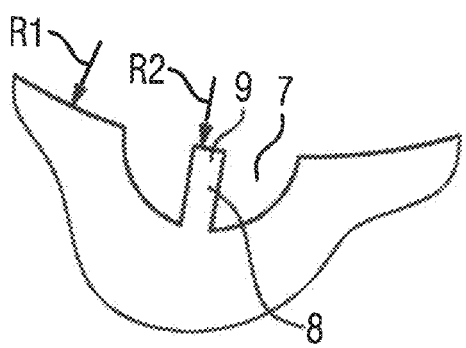
FIG. 13 shows a pull-through groove with a rectangular lamination tongue.

FIG. 12 shows a lamination tongue 8 of a pull-through groove 7 which has a trapezoid design. This effects an axially greater reset force of the end 9 of the lamination tongue 8 compared with the lamination tongue 8 according to FIG. 13 with parallel flanks. The torque transmission of the laminated core 2 onto the shaft 4 is therefore further improved.

Basically, other moldings of the lamination tongues 8 are also possible, in order, depending on requirements, to obtain a minimal or larger axial reset force at the ends 9 of the lamination tongues 8. The reset force. Is therefore influenced by the difference in the radii R1 and R2, and also by the material of the lamination 1, by the molding of the lamination tongues 8 and also the number of pull-through grooves 7 on the shaft bore 3 of a lamination 1.

Figure 14:
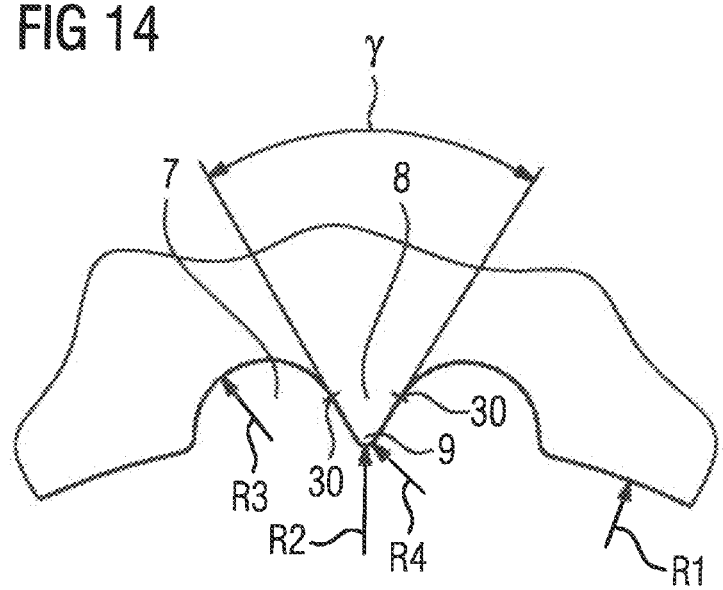
FIG. 14 shows a pull-through groove with a conical lamination tongue.

FIG. 14 therefore shows a further pull-through groove 7. This pull-through groove 7 is preferably formed on the shaft bore 3 by two pitch circles with a radius R3, which, in terms of course, pass from a predeterminable transition point 30 from the radius R3 in each case into a straight line and thus form the lamination tongue 8, which encloses an angle γ with the straight line. By choosing the transition points 30 on the pitch circles with radius R3, the angle is γ and the bending stiffness of the lamination tongue 8 can thus also inter alia be adjusted.

The score marks formed on the shaft 4 during the axial joining can therefore also be influenced by way of the radius R4 of the end 9 of the lamination tongue 8, inter alia.

For instance, with a shaft diameter of approx. 50 mm R4 in the region of fractions of a mm; R3 with a few mm and in each case in the region of approx. 30° to 70°.

With other shaft diameters/axle heights, other locations can accordingly also result or emerge as useful.

Figure 15:
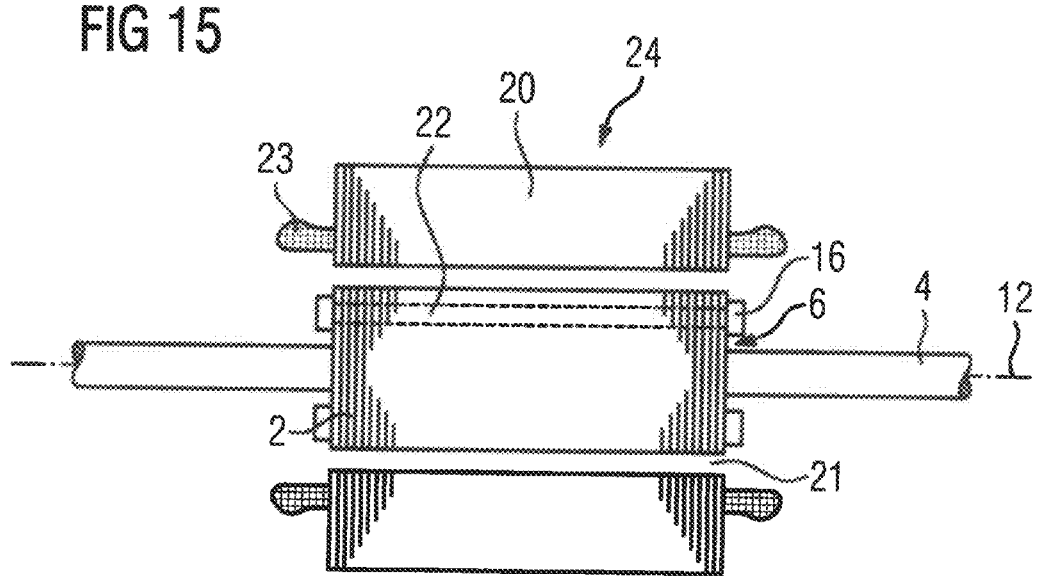
FIG. 15 shows a dynamo-electric machine.

FIG. 15 shows a dynamo-electric rotary machine 24 shown in principle with a rotor 6, which is designed as a squirrel cage rotor. On its front faces, the rotor 6 shows a short-circuit ring 16 which short-circuits the electrical conductor 22 in the grooves 5 of the rotor 6. By electromagnetic interaction of the rotor 6 by way of an air gap 21 with a powered winding system 23 in a stator 20, a torque is generated on the shaft 4.

Machines 24 of this type are used above all for drives for instance in the oil and gas industry, food industry, in conveyor belts. There they drive inter alia compressors, fans and machine tools. Similarly, they can also be used as drives in traffic engineering.

The invention claimed is:

1. A lamination of a rotor of a rotary dynamo-electric machine, said lamination comprising:
   a shaft bore for receiving a shaft, said shaft bore defined by a first radius; and
   at least two pull-through grooves, each of the pull-through grooves having a lamination tongue having a conical configuration with a non-zero cone angle and facing radially inwards towards an axis such that a radially-inwardly facing end of the lamination tongue defines a second radius which is smaller than the first radius so as to achieve a form-fit with the shaft to effect an anti-rotation protection and axial safety against slippage on the shaft, each of the pull-through grooves formed on the shaft bore by two pitch circles which are defined by a third radius and configured to transition each at a predeterminable transition point from the third radius into a straight line, with the straight lines intersecting at the end of the lamination tongue and enclosing the conical lamination tongue, wherein a location of the predeterminable transition point from the third radius into the straight line is selected to adjust the non-zero angle and the bending stiffness of the lamination tongue in order to provide form-fit score marks on a radially outward facing surface of the shaft.

2. The lamination of claim 1, wherein the pull-through grooves are equally distributed circumferentially in the shaft bore.

3. The lamination of claim 1, wherein the pull-through grooves lie opposite one another in the shaft bore.

4. The lamination of claim 1, further comprising two intermediate space recesses arranged between the pull-through grooves, as viewed in a circumferential direction.

5. The lamination of claim 1, wherein the straight lines are connected at the radially-inwardly facing end of the lamination tongue by a circular tip having a fourth radius.

6. A laminated core of a rotor of a rotary dynamo-electric machine, said laminated core comprising:

a plurality of laminations, each lamination comprising a shaft bore for receiving a shaft, said shaft bore defined by a first radius, at least two pull-through grooves, each of the pull-through grooves having a lamination tongue having a conical configuration with a non-zero cone angle and facing radially inwards towards an axis such that a radially-inwardly facing end of the lamination tongue defines a second radius which is smaller than the first radius so as to achieve a form-fit with the shaft to effect an anti-rotation protection and axial safety against slippage on the shaft, each of the pull-through grooves formed on the shaft bore by two pitch circles which are defined by a third radius and configured to transition each at a predeterminable transition point from the third radius into a straight line, with the straight lines intersecting at the end of the lamination tongue and enclosing the conical lamination tongue, and two intermediate space recesses, wherein a location of the predeterminable transition point from the third radius into the straight line is selected to adjust the non-zero angle and the bending stiffness of the lamination tongue in order to provide form-fit score marks on a radially outward facing surface of the shaft said plurality of laminations being axially layered in an axial direction such that the lamination tongues of one of the laminations are arranged between adjacent ones of the laminations which in a region of the lamination tongues of the one of the laminations have the intermediate space recesses to effect an anti-rotation protection and axial stability against slippage on the shaft.

7. The laminated core of claim 6, wherein the pull-through grooves are equally distributed circumferentially in the shaft bore.

8. The laminated core of claim 6, wherein the pull-through grooves lie opposite one another in the shaft bore.

9. The laminated core of claim 6, wherein the intermediate space recesses, viewed in a circumferential direction, are arranged between the pull-through grooves.

10. A method for joining a laminated core constructed as set forth in claim 6 to a shaft, said method comprising:

processing a radially outward facing surface of the shaft to form processing notches with a surface roughness of at least RZ25; and axially pressing a shaft bore of the laminated core onto the shaft up to a predetermined axial position to cause lamination tongues of laminations of the laminated core to rub along the shaft and smooth tips of the processing notches on the shaft to thereby form form-fit score marks on an external diameter the radially outward facing surface of the shaft.

11. A dynamo-electric rotary machine, comprising:

a shaft; and a rotor including a laminated core, said laminated core comprising a plurality of laminations, each lamination comprising a shaft bore for receiving the shaft, said shaft bore defined by a first radius, at least two pull-through grooves, each of the pull-through grooves having a lamination tongue having a conical configuration with a non-zero cone angle and facing radially inwards towards an axis such that a radially-inwardly facing end of the lamination tongue defines a second radius which is smaller than the first radius so as to achieve a form-fit with the shaft to effect an anti-rotation protection and axial safety against slippage on the shaft, each of the pull-through grooves formed on the shaft bore by two pitch circles which are defined by a third radius and configured to transition each at a predeterminable transition point from the third radius into a straight line, with the straight lines intersecting at the end of the lamination tongue and enclosing the conical lamination tongue, wherein a location of the predeterminable transition point from the third radius into the straight line is selected to adjust the non-zero angle and the bending stiffness of the lamination tongue in order to provide form-fit score marks on a radially outward facing surface of the shaft said plurality of laminations being axially layered in an axial direction such that the lamination tongues of one of the laminations are arranged between adjacent ones of the laminations which in a region of the lamination tongues of the one of the laminations have intermediate space recesses.

12. The dynamo-electric rotary machine of claim 11, wherein the pull-through grooves are equally distributed circumferentially in the shaft bore.

13. The dynamo-electric rotary machine of claim 11, wherein the pull-through grooves lie opposite one another in the shaft bore.

14. The dynamo-electric rotary machine of claim 11, wherein the intermediate space recesses, viewed in a circumferential direction, are arranged between the pull-through grooves.

15. The dynamo-electric rotary machine of claim 11, constructed for use in a compressor, pump, or machine tool.

16. The dynamo-electric rotary machine of claim 11, wherein the radially outward facing surface of the shaft comprises processing notches with a surface roughness of at least RZ25.

17. A lamination of a rotor of a rotary dynamo-electric machine, said lamination comprising:

a shaft bore for receiving a shaft, said shaft bore defined by a first radius; and at least two pull-through grooves, each of the pull-through grooves bounding a lamination tongue having a trapezoidal configuration and facing radially inwards towards an axis such that a radially-inwardly facing end of the lamination tongue defines a second radius which is smaller than the first radius so as to achieve a form-fit with the shaft to effect an anti-rotation protection and axial safety against slippage on the shaft, each of the pull-through grooves formed on the shaft bore by two pitch circles configured to transition each at a predeterminable transition point into a straight line, with the straight lines connected at the radially inwardly facing end of the lamination tongue by a straight line, wherein a location of the predeterminable transition point from the third radius into the straight line is selected to adjust the non-zero angle and the bending stiffness of the lamination tongue in order to provide form-fit score marks on a radially outward facing surface of the shaft.

\* \* \* \* \*

UNITED STATES PATENT AND TRADEMARK OFFICE
CERTIFICATE OF CORRECTION

PATENT NO. : 12,255,496 B2
APPLICATION NO. : 17/421635
DATED : March 18, 2025
INVENTOR(S) : Klaus Büttner, Klaus Kirchner and Matthias Warmuth Page 1 of 1

It is certified that error appears in the above-identified patent and that said Letters Patent is hereby corrected as shown below:

On the Title Page

Item (56) under FOREIGN PATENT DOCUMENTS:
Replace "CN 101827521 A" with the correct reference no. --CN 101627521 A--;

In the Claims

In Column 8, Claim 10, Line 9:
Delete "an external diameter".

Signed and Sealed this
Third Day of June, 2025

Coke Morgan Stewart
*Acting Director of the United States Patent and Trademark Office*